United States Patent
Moews et al.

(10) Patent No.: US 10,525,491 B2
(45) Date of Patent: Jan. 7, 2020

(54) SAFETY AND CONTROL DEVICE FOR PRESSURIZED CONTAINERS, AND PRESSURIZED CONTAINER HAVING SUCH A SAFETY AND CONTROL DEVICE

(71) Applicant: BASF Coatings GMBH, Münster (DE)

(72) Inventors: Philipp Moews, Muenster (DE); Andreas Schroeer, Ascheberg (DE); Sibylle Schoeps, Muenster (DE); Roland Meisner, Senden (DE)

(73) Assignee: BASF Coatings GmbH, Münster (DE)

( * ) Notice: Subject to any disclaimer, the term of this patent is extended or adjusted under 35 U.S.C. 154(b) by 82 days.

(21) Appl. No.: 15/573,304

(22) PCT Filed: May 11, 2016

(86) PCT No.: PCT/EP2016/060523
§ 371 (c)(1),
(2) Date: Jan. 12, 2018

(87) PCT Pub. No.: WO2016/180863
PCT Pub. Date: Nov. 17, 2016

(65) Prior Publication Data
US 2018/0200741 A1    Jul. 19, 2018

(30) Foreign Application Priority Data
May 12, 2015    (EP) ..................... 15167261

(51) Int. Cl.
*B05B 7/24* (2006.01)
*B05B 9/08* (2006.01)
(Continued)

(52) U.S. Cl.
CPC ............ *B05B 7/241* (2013.01); *B05B 9/0805* (2013.01); *F16K 11/0716* (2013.01);
(Continued)

(58) Field of Classification Search
CPC ... B05B 9/0805; B05B 7/2472; B05B 7/2478; B05B 12/008; F16K 11/0716; F16K 17/0473; F16K 17/10
(Continued)

(56) References Cited

U.S. PATENT DOCUMENTS 1,710,435 A  *  4/1929  Shelburne ................. B05B 7/24
                                                    222/325
3,507,309 A  *  4/1970  Johnson ................ B05B 9/0805
                                                    137/557
(Continued)

FOREIGN PATENT DOCUMENTS

DE    1238820 B    4/1967
DE    1245814 B    7/1967
(Continued)

OTHER PUBLICATIONS

Extended European Search Report for EP Patent Application No. 15167261.5, dated Nov. 24, 2015, 4 pages.
(Continued)

*Primary Examiner* — Craig M Schneider
*Assistant Examiner* — Angelisa L. Hicks
(74) *Attorney, Agent, or Firm* — Armstrong Teasdale LLP

(57) ABSTRACT

Provided herein is a safety and control device for pressure vessels for application devices for liquid media including a safety valve, a control device for the operating pressure, a pressure indicator, and a pressure relief, as well as a means for connecting the device to the pressure vessel, the device having a housing, which is provided with a compressed air supply and an air outlet, and a multifunctional slide arranged within the housing. The multifunctional slide defines a channel, which is connected to a blind bore and a pin and at the end has means for relieving the pressure by manual actuation. A spiral spring encloses a pin and supports the
(Continued)

multifunctional slide with respect to a bottom of the housing. Locking means enable the pin to be arrested in a position protruding from the housing.

17 Claims, 7 Drawing Sheets

(51) Int. Cl.
*F16K 11/07* (2006.01)
*F16K 17/04* (2006.01)
*F16K 17/10* (2006.01)
*B05B 12/00* (2018.01)

(52) U.S. Cl.
CPC .......... *F16K 17/0473* (2013.01); *F16K 17/10* (2013.01); *B05B 7/2472* (2013.01); *B05B 7/2478* (2013.01); *B05B 12/008* (2013.01)

(58) Field of Classification Search
USPC .................................. 137/625.25, 625.67–69
See application file for complete search history.

(56) References Cited

U.S. PATENT DOCUMENTS

| 4,174,070 A | 11/1979 | Bujnowski et al. |
| 2010/0078085 A1* | 4/2010 | Kurokawa .......... F16K 17/0473 137/528 |

FOREIGN PATENT DOCUMENTS

| DE | 3032329 A1 | 3/1981 |
| DE | 3125627 A1 | 1/1983 |
| DE | 29705779 U1 | 6/1997 |
| EP | 0039005 A1 | 11/1981 |
| FR | 1369788 A | 8/1964 |
| GB | 290866 A | 5/1928 |
| WO | PCT-2009/054986 A1 | 4/2009 |
| WO | PCT-2016/020129 A1 | 2/2016 |

OTHER PUBLICATIONS

International Search Report and Written Opinion for PCT Patent Application No. PCT/EP2016/060523, dated Aug. 4, 2016, 12 pages.

* cited by examiner

SAFETY AND CONTROL DEVICE FOR PRESSURIZED CONTAINERS, AND PRESSURIZED CONTAINER HAVING SUCH A SAFETY AND CONTROL DEVICE

CROSS-REFERENCE TO RELATED APPLICATIONS

This application is the national stage entry of PCT/EP2016/060523 filed on May 11, 2016, which claims the benefit of priority to European Patent Application No. 15167261.5, filed on May 12, 2015, which is incorporated by reference in its entirety herein.

FIELD OF DISCLOSURE

The invention relates to a safety and control device for pressure vessels for application devices for liquid media.

BACKGROUND

The patent application DE 30 32 329 A1 describes an air-pressure and flow control valve combination for controlling the stream of compressed air in a pneumatic circuit that includes a pneumatically controlled device. The device has a control and shut-off valve body, which can be moved between open and closed positions. The device also has a flow control valve body, which can be moved into a closed position and into an open position. The device is suitable for industrial compressed air applications in which a reduced pressure on the outflow side is desired. Mentioned as an example is an application in which the valve combination can be connected to both ends of an air cylinder, in order to control the latter either in one direction or in both directions. The air cylinder may be installed in industrial machines of various types. The valve combination is of a very complex construction and its use for pressure vessels for application devices for liquid media is not described.

In the patent application EP 0 039 005 A1, a valve assembly for a pressure cooker is described. This uses a pin protruding from a hood as a pressure indicator. A use for pressure vessels for application devices for liquid media is not described.

SUMMARY

For the purposes of the present invention, application devices for liquid media are in particular pneumatic paint-spray guns with which paint is applied to an object to be painted. The paint-spray guns have a pressure vessel to which compressed air is admitted. The device according to the invention may, however, be used not only for paint-spray guns but also generally for spraying devices for liquid media. Liquid adhesives, impregnating fluids and the like may be mentioned by way of example.

The device according to the invention is described hereinafter in connection with paint-spray guns.

Spray-painting methods, for example without electrostatic charging of the paint, are widely used in industrial and commercial paint shops. The methods are especially distinguished in comparison with other painting methods in that they can be used manually, have a high degree of flexibility with respect to the shape, size and materials of the objects painted and with respect to the choice of paint and changing of the paint, are mobile in their use and entail relatively low investment costs (H. Kittel, "Lehrbuch der Lacke and Beschichtungen" [textbook of paints and coatings], second edition, volume 9, pages 26-40; S. Hirzel Verlag Stuttgart Leipzig, 2004).

The spray-painting methods can be divided essentially into pneumatic spraying by a high-pressure or low-pressure method and airless spraying, without or with air assistance.

Around 1900, pneumatic atomization or pneumatic spraying was developed as the first spray-painting method. Even today, pneumatic atomization is most often used in industry and commerce. In the case of high-pressure spraying, also referred to as conventional spraying or pneumatic spraying, an air pressure of approximately 2 to 7 bar is usually used, while in the case of low-pressure spraying, also referred to as HVLP spraying ("High Volume, Low Pressure" spraying or spraying with a high spray volume flow and low pressure), an air pressure of 0.2 to 0.7 bar is usually used (H. Kittel, ibidem).

At the atomizer head, the compressed air flows out of an annular orifice, which is formed by a central bore in the air cap and the paint nozzle arranged therein. Further air jets from various air cap bores serve for regulating the shape of the jet and for assisting the atomization. The compressed air flowing out at high speed has the effect of producing an area of negative pressure directly at the mouth of the paint nozzle, with a suction effect that helps the paint to flow out from a so-called suction cup, especially when the paint is supplied in a pressureless state (H. Kittel, ibidem).

Apart from delivering the paint material from a suction cup, there is also the possibility, depending on the amount required and the viscosity, of supplying the paint material by delivery systems such as gravity cups, pressure vessels or circulating-air systems of the spray gun nozzle.

Paint-spray guns provided with a pressure vessel allow higher material outflow rates than suction-cup or gravity-cup guns. The paint to be sprayed is located in the pressure vessel. Depending on the embodiment, the paint is either filled directly into the pressure vessel or a cartridge filled with paint is loaded into the pressure vessel. After closing the pressure vessel, it is connected to a supply of compressed air and pressurized.

For safety reasons, pressurized cups for handheld paint-spray guns must have a safety valve, a safety locking mechanism, a pressure indicator and a pressure relief. At the same time, the operating pressure of the cup must be ensured.

The safety valve ensures that the cup cannot be subjected to the entire pressure generated by the pressure supply device, for example 12 bar, but that this pressure is limited to the maximum admissible pressure for the pressurized cup.

The safety locking mechanism prevents the possibility of a pressurized cup being removed from the handheld paint-spray gun unintentionally, for example without a tool, and a resultant uncontrolled escape of material.

The pressure indicator indicates to the user when the cup is under pressure.

The pressure relief enables the user to perform rapid venting.

The necessary operating pressure is intended to be ensured by a pressure control.

The object of the present invention is to provide a safety and control device of the type mentioned at the beginning that performs all of the aforementioned functions. At the same time, the device is intended to be of a simple construction, compact and lightweight.

It is also intended that the device can be easily handled.

The aforementioned objects are achieved according to the invention by a safety and control device for pressure vessels for application devices for liquid media comprising a safety valve, a control device for the operating pressure, a pressure indicator and a pressure relief as well as means for connecting the device to the pressure vessel, the device having a housing, which is provided with a compressed air supply and an air outlet, a multifunctional slide being arranged within the housing, said slide being axially displaceable and enclosed by said housing, the multifunctional slide having a channel, which is connected to a blind bore leading to the pressure vessel and, depending on the position of the multifunctional slide, in the rest position is only connected to the compressed air supply, in the operating position is connected to the compressed air supply and the air outlet and in the venting position is only connected to the air outlet, the multifunctional slide being connected at its end opposite from the blind bore to a pin, which protrudes from the housing through an opening and at the end has means for relieving the pressure by manual actuation, a spiral spring that encloses the pin and supports the multifunctional slide with respect to the bottom of the housing being arranged in the housing in the region of the pin, and there being locking means, which make it possible for the pin to be arrested in a position protruding from the housing.

The means for relieving the pressure by manual actuation may be advantageously configured as a lever, plate or ring, which are connected to the pin protruding from the housing.

The means for relieving the pressure may advantageously be formed as a separate component that is arranged within the compressed air supply.

The spiral spring arranged within the housing preferably consists of two springs with different spring rates, the spring with the higher spring rate being shorter than the spring with the lower spring rate. This achieves the effect that the multifunctional slide is initially supported only by the spring with the lower spring rate. Only when the multifunctional slide has moved by an amount, to be specific the difference in length of the two springs, in the direction of the bottom of the housing under pressure loading does the spring with the higher spring rate come into effect. A particularly favorable response behavior of the device to the application of pressure is achieved by this arrangement.

The desired operating pressure can be controlled by choosing springs with suitable spring rates.

The locking means may be advantageously formed as a catch. If suitably adapted to the respective paint-spray gun, the catch can interact with it and bring about an arrestment of the multifunctional slide in the lifted-out position. The catch may for example also be arranged displaceably on the venting lever and pushed under the bottom of the housing when the pin is extended, in order to achieve an arrestment.

The locking means may also be advantageously formed as a bayonet fastener.

The housing may be connected to the pressure vessel in a force-fitting, form-fitting or material-bonding manner.

The invention also relates to a pressure vessel that is provided with a safety and control device according to the invention, the safety and control device being arranged within the bottom of the pressure vessel and being connected to it in a gastight manner.

BRIEF DESCRIPTION OF THE DRAWINGS

The invention is explained in more detail below on the basis of the drawing, in which.

DETAILED DESCRIPTION

Figure 1:
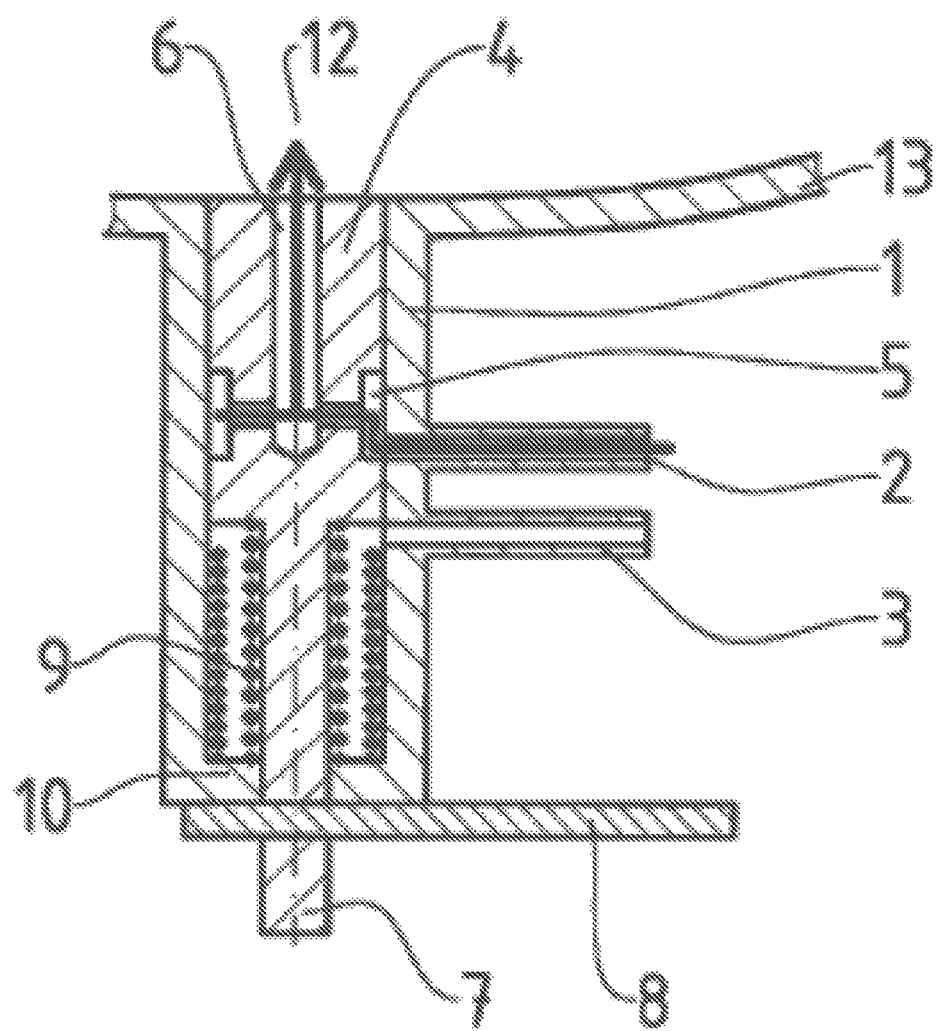
FIG. 1 shows a section through the safety and control device according to the invention in the rest position.

The device has a housing 1, which is provided with a compressed air supply 2 and an air outlet 3. Arranged within the housing 1 is a multifunctional slide 4, which is axially displaceable and is enclosed by the housing. The inside diameter of the housing 1 and the outside diameter of the multifunctional slide 4 are adapted to one another in such a way that on the one hand the multifunctional slide is gastight, to the extent to which this is technically possible, and that on the other hand the displaceability is still ensured.

The multifunctional slide 4 has a peripheral channel 5, which is connected to a blind bore 6 leading to the pressure vessel. The channel is connected in the rest position of the multifunctional slide only to the compressed air supply 2, in the operating position to the compressed air supply 2 and the air outlet 3 and in the venting position only to the air outlet 3. The connection to the air outlet 3 in the operating position achieves the effect that a small part of the compressed air escapes through the air outlet 3 during operation. As a result, the control of the device under operating conditions is improved.

The multifunctional slide 4 is connected at its end opposite from the blind bore 6 to a pin 7, which protrudes from the housing 1 through an opening and at the end outside the housing bears a means for relieving the pressure in the form of a venting lever 8. Manual venting of the device can be achieved by the venting lever being pulled down against the pressure of the springs of the spiral spring 9 and the multifunctional slide being brought into the venting position. The multifunctional slide 4 can be arrested in the venting position by a catch 11 as a locking means. The catch 11 either interacts with part of the spray gun or is displaceable on the venting lever 8 and can be pushed under the housing 1, in order to achieve the arrestment.

Arranged in the housing 1 in the region of the pin are springs 9, which enclose the latter and support the multifunctional slide 4 with respect to the bottom 10 of the housing 1.

Figure 2:
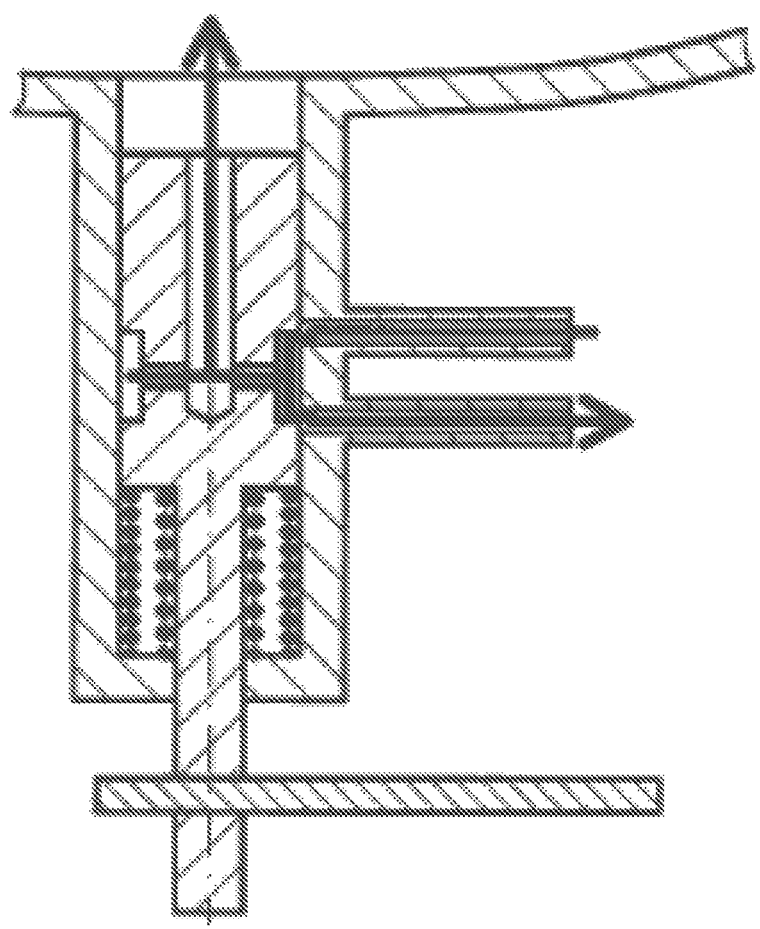
FIG. 2 shows a section through the safety and control device according to the invention in the operating position.
Figure 3:
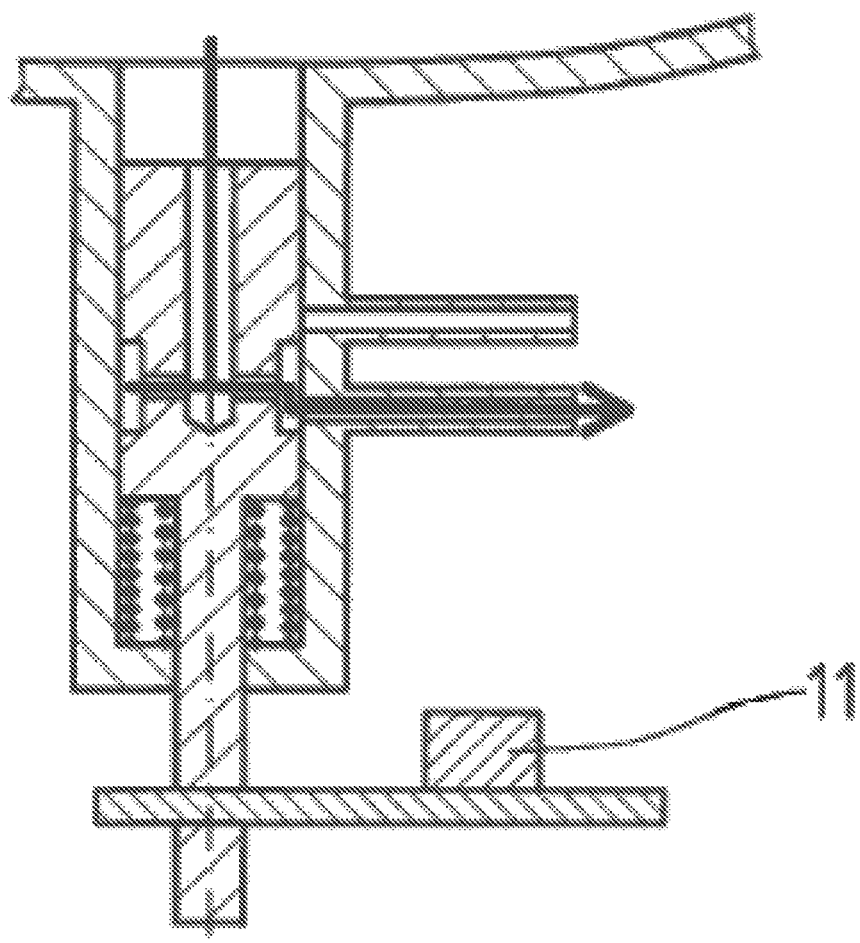
FIG. 3 shows a section through the safety and control device according to the invention in the venting position.

The path that is opened in each case for the compressed air is indicated in FIGS. 1 to 3 by the lines ending with arrows. In FIG. 1, compressed air is applied by the compressed air supply to the pressure vessel. The compressed air flows via the multifunctional slide 4 into the pressure vessel and thereby pushes the multifunctional slide 4 down against the two springs. As a result, the lower end of the pin 7 is pushed down out of the housing 1. The end of the pin 7 protruding from the housing 1 indicates to the user that the pressure vessel 12 is under pressure. This meets the requirement for the pressure to be indicated.

The two springs 9 are designed in such a way that, when the operating pressure is reached, the multifunctional slide 4 has been pushed down to such an extent that the air supply is connected to the air outlet, as is represented in FIG. 2. A small part of the compressed air is now removed again directly through the air outlet channel. This prevents the column of air on the air supply side having to be fully accelerated each time spraying is started, and the controller becoming unstable as a result.

The structural design means that it is not possible for a pressure higher than the operating pressure to build up in the pressure vessel. This provides the function of a safety valve.

For venting, the painter uses the lever to pull the multifunctional slide 4 down and arrests it, for example by means of a catch 11. Compressed air then no longer enters the pressure vessel, since the supply line is closed. The pressure is reduced by way of the air outlet 3 and the pressure vessel now becomes pressureless (see FIG. 3).

Figure 4:
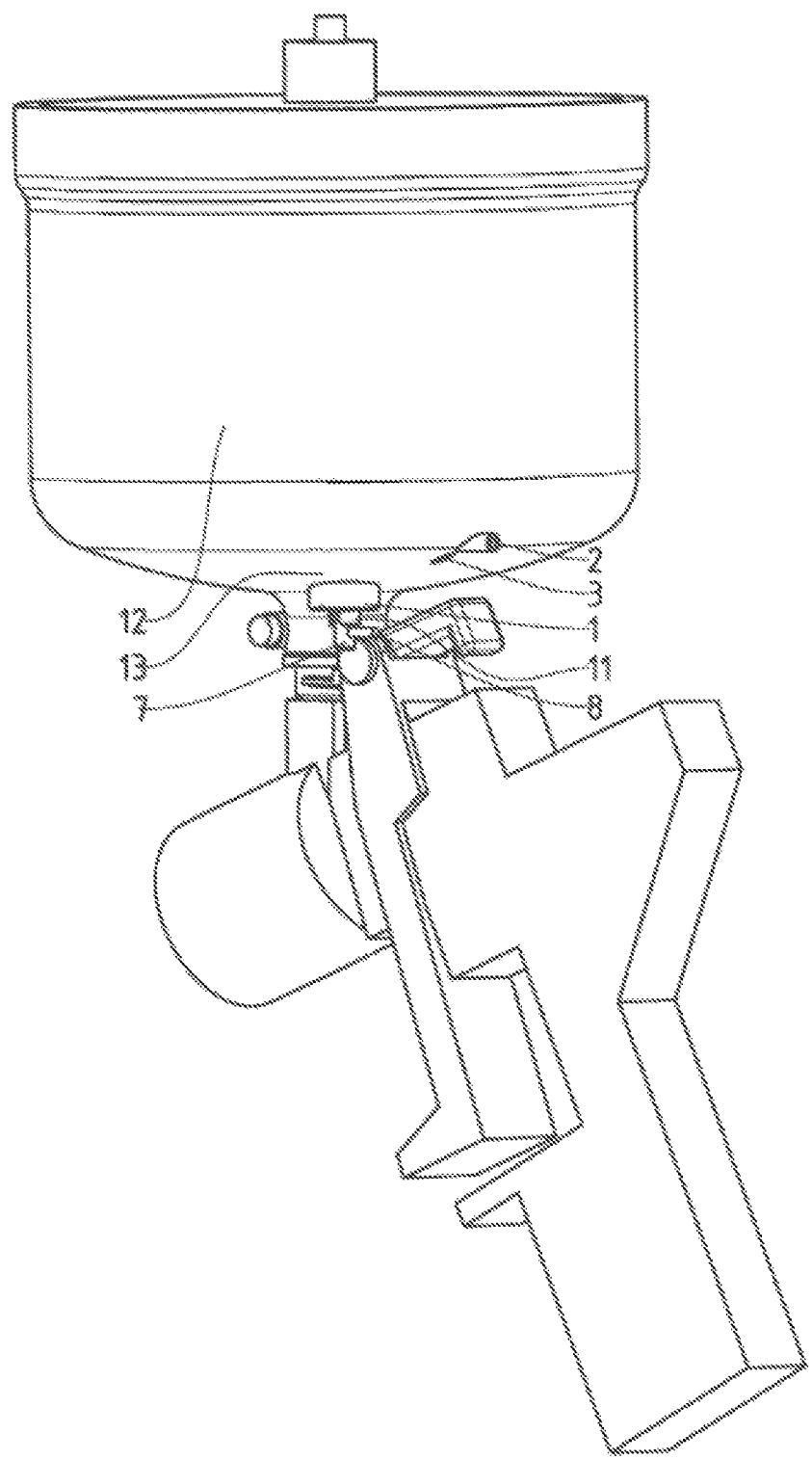
FIG. 4 shows a pressure vessel that is provided with a safety and control device according to the invention and is connected to a spray gun.

The function of the safety locking mechanism is ensured as follows:

The safety and control device is arranged within the bottom 13 of the pressure vessel 12. When the pressure vessel 12 is under pressure, the lower end of the pin 7 protrudes down from the housing 1. In FIG. 4 it can be seen that, if it is attempted to unscrew the pressure vessel 12 under pressure from the handheld paint-spray gun, the protruding end of the pin 7 butts against the paint-spray gun. Consequently, turning of the pressure vessel 12 is no longer possible. As soon as the supply of compressed air is shut off or the compressed air tube has been removed, the pressure vessel becomes pressureless and the lower end of the pin 7 is retracted again into the housing 1. The pressure vessel 12 can now be unscrewed from the handheld paint-spray gun. This provides the safety function.

Figure 5:
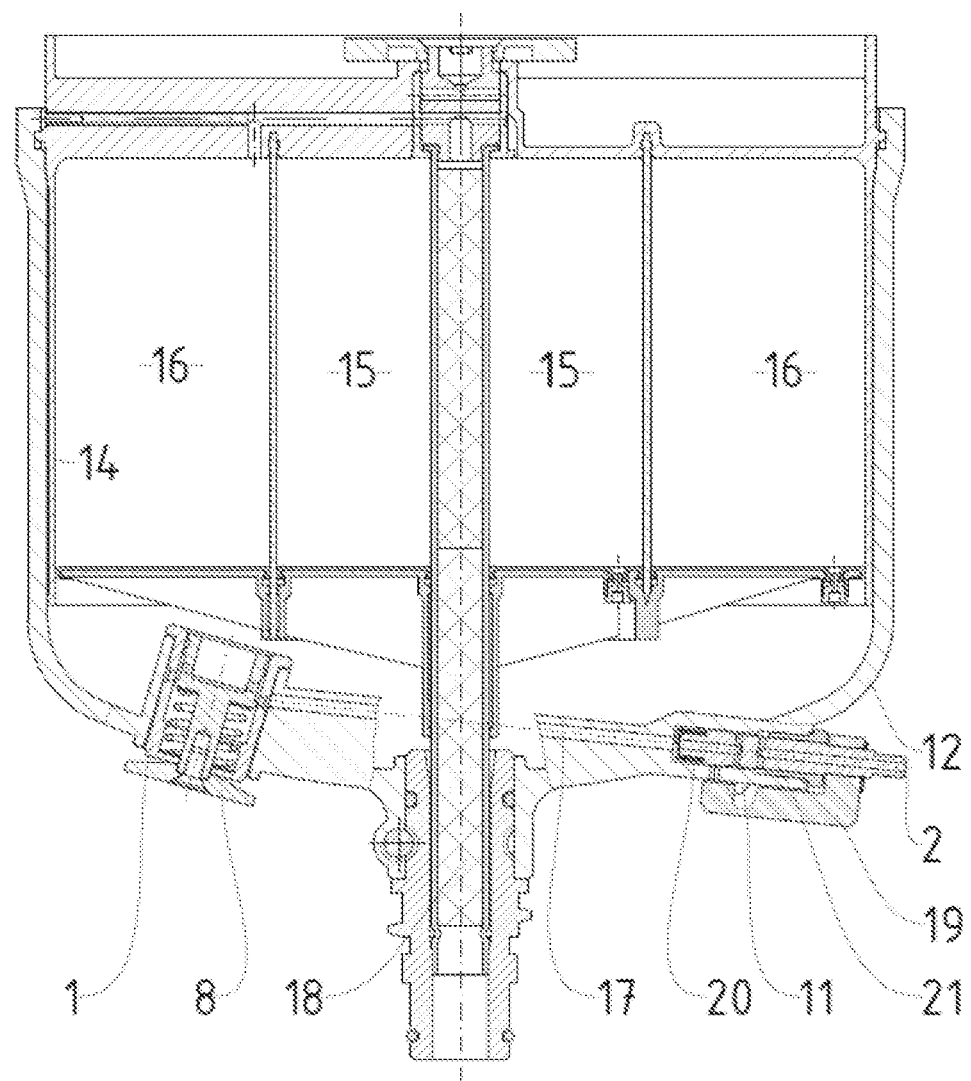
FIG. 5 shows a section through a pressure vessel that is provided with a safety and control device according to the invention and is filled with a cartridge for receiving paint material.

FIG. 5 shows the safety and control device in connection with a pressure vessel 12, into which a cartridge 14 for receiving paint material has been loaded. This is a cartridge for 2-component paints. The components of the paint are received by the concentrically arranged chambers 15 and 16.

Figure 6:
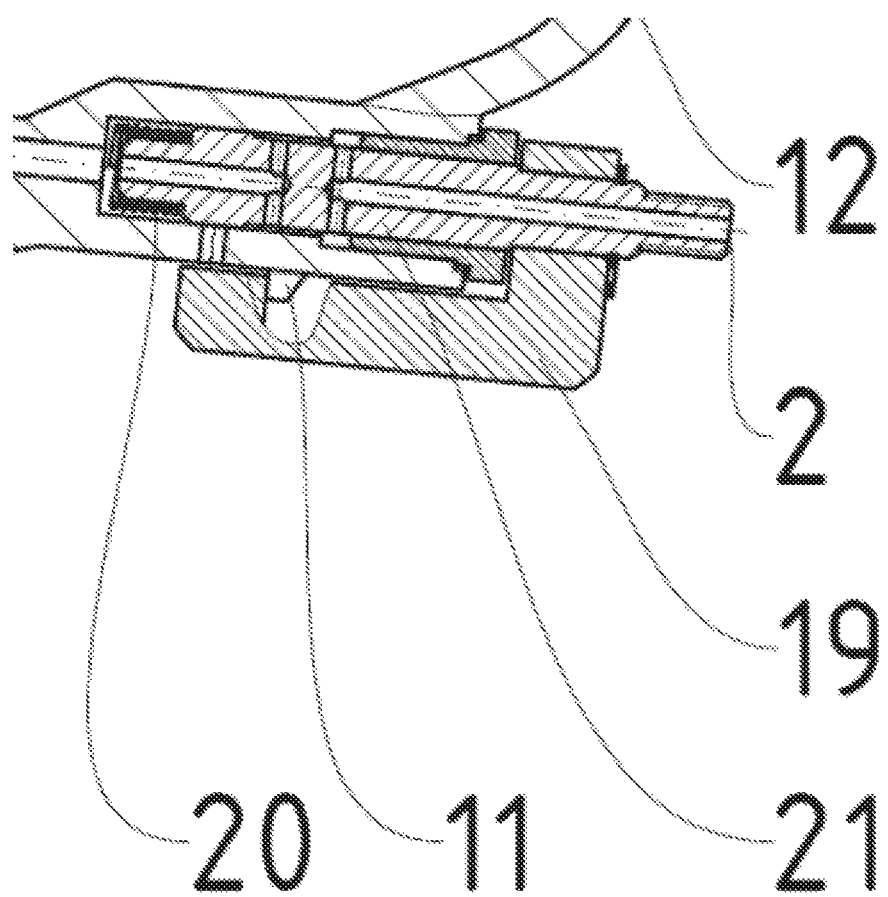
FIG. 6 shows an enlargement of part of the section through the pressure vessel according to FIG. 5

The means for relieving the pressure as a separate component 21 are connected to the carriage 19. In the case of the embodiment according to FIG. 5, they are arranged within the compressed air supply 2 and are connected to the housing 1 by way of a channel 17. For venting, the carriage 19 is released by the catch 11. By way of the spring 20, the means for relieving the pressure as a separate component 21 are pushed back and the pressure vessel 12 is vented. If it is attempted to unscrew the pressure vessel 12 under pressure from the handheld paint-spray gun, the carriage 19 butts against the body of the gun. With further turning, the carriage 19 is pushed out of the catch 11. The means for relieving the pressure as a separate component 21 are then pushed back by the spring 20 and the pressure vessel 12 is forcibly vented. This relevant detail from FIG. 5 is shown enlarged in FIG. 6.

In addition, the device has means for relieving the pressure 8 that perform the function of a venting lever, and by way of which pressure venting can likewise be brought about.

If pressure is admitted to the pressure vessel 12, the components of the paint are supplied to the spray gun by a static mixer 18.

Figure 7:
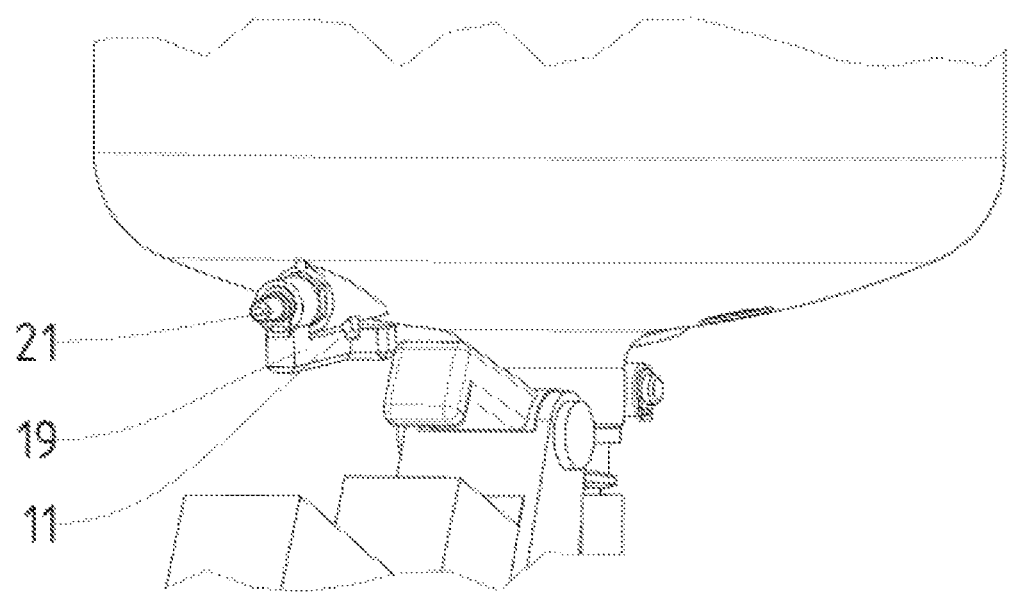
FIG. 7 shows a 3D section through part of a pressure vessel according to FIG. 5 that is provided with a safety and control device according to the invention and is filled with a cartridge for receiving paint material.

FIG. 7 shows a 3D section through part of a pressure vessel according to FIG. 5 that is provided with a safety and control device according to the invention and is filled with a cartridge for receiving paint material and shows the position of the carriage 19, the means for relieving the pressure 21 and the catch 11.

LIST OF DESIGNATIONS

1. Housing
2. Compressed air supply
3. Air outlet
4. Multifunctional slide
5. Channel
6. Blind bore
7. Pin
8. Means for relieving the pressure
9. Spiral spring, formed as two springs
10. Bottom of the housing
11. Locking means in the form of a catch
12. Pressure vessel
13. Bottom of the pressure vessel
14. Cartridge
15. Chamber
16. Chamber
17. Channel
18. Mixer
19. Carriage
20. Spring
21. Means for relieving the pressure as a separate component

The invention claimed is:

1. A safety and control device for a pressure vessel for application devices for liquid media, the device comprising:
   means for connecting the device to the pressure vessel;
   a housing connected to the pressure vessel, the housing provided with a compressed air supply and an air outlet;
   a multifunctional slide arranged within said housing, said multifunctional slide being axially displaceable within and enclosed by said housing, said multifunctional slide defining a channel that is connected to a blind bore leading to the pressure vessel and, when said multifunctional slide is in a rest position, said multifunctional slide is only connected to the compressed air supply, when said multifunctional slide is in an operating position, said multifunctional slide is connected to the compressed air supply and the air outlet, and, when said multifunctional slide is in a venting position, the multifunctional slide is connected to the air outlet but not the compressed air supply, said multifunctional slide being connected at a first end thereof opposite from the blind bore to a pin, which protrudes from said housing through an opening and at the first end has means for relieving the pressure by manual actuation;
   a spiral spring arranged in said housing, wherein said spiral spring encloses said pin and supports said multifunctional slide with respect to a bottom of said housing; and
   locking means, which enable said pin to be arrested in a position protruding from said housing.

2. The safety and control device as claimed in claim 1, wherein said means for relieving the pressure by manual actuation are configured as at least one of a lever, plate and ring.

3. The safety and control device as claimed in claim 1, wherein said means for relieving the pressure are formed as a separate component within the compressed air supply.

4. The safety and control device as claimed in claim 3, wherein the separate component is connected to a carriage.

5. The safety and control device as claimed in claim 4, wherein the carriage is formed in an L-shaped manner and is configured to be arrested by way of said locking means.

6. The safety and control device as claimed in claim 1, wherein said spiral spring is formed by two springs with different spring rates, the spring with a higher spring rate being shorter than the spring with a lower spring rate.

7. The safety and control device as claimed in claim 1, wherein said locking means are formed as a catch.

8. The safety and control device as claimed in claim 1, wherein said locking means are formed as a bayonet fastener.

9. The safety and control device as claimed in claim 1, wherein said housing is connected to the pressure vessel in at least one of a force-fitting, form-fitting, and material-bonding manner.

10. A pressure vessel with a safety and control device as claimed in claim 1, wherein the safety and control device is arranged within the bottom of the pressure vessel and is connected to the pressure vessel in a gastight manner.

11. The safety and control device as claimed in claim 1, wherein the channel is only connected to the compressed air supply when the multifunctional slide is in the rest position.

12. The safety and control device as claimed in claim 1, wherein the channel is only connected to the air outlet when the multifunctional slide is in the venting position.

13. The safety and control device as claimed in claim 1, wherein the channel is connected to both the the compressed air supply and the air outlet when the multifunctional slide is in the operating position.

14. The safety and control device as claimed in claim 1, wherein the compressed air supply and the air outlet are spaced from each other and positioned at different axial locations along the housing.

15. The safety and control device as claimed in claim 1, wherein the channel extends about a periphery of the multifunctional slide.

16. The safety and control device as claimed in claim 1, wherein the pin is translatable relative to the housing between a first position, when the multifunctional slide is in the rest position, and a second position, when the multifunctional slide is in the venting position.

17. The safety and control device as claimed in claim 16, wherein the pin is configured to indicate that the pressure vessel is under pressure when the pin is translated from the first position.

* * * * *